INVENTOR.
HARRY W. EVANS
BY
ATTORNEY

INVENTOR.
HARRY W. EVANS
BY
ATTORNEY

3,451,666
Patented June 24, 1969

3,451,666
CONTOUR PIPE CUTTING MACHINE
Harry Willis Evans, 1720 W. Francis Drive,
Anaheim, Calif. 92801
Filed Sept. 5, 1967, Ser. No. 665,420
Int. Cl. B23k 5/00, 7/00; B43l 11/00
U.S. Cl. 266—23           4 Claims

ABSTRACT OF THE DISCLOSURE

A contour pipe cutting machine in which a cutting torch is guided by means of a fixed cam to cut a particular pattern in a pipe section, and wherein a motor drive means is mounted on a frame hingedly supported by arms extending from the cam so the motor frame can tilt slightly to compensate for vertical movement of the cam follower.

---

In order to connect one pipe to another it is necessary to cut a hole in one pipe to receive a second pipe, so that the pipe sections can be welded or otherwise fixedly attached in the usual and well known manner. The cutting torch or element is guided by means of a nonrotatable cam plate, and the cam follower as well as the cutting element can be adjusted horizontally to vary the size and shape of the hole which is cut in the pipe.

An object of my invention is to provide a novel contour pipe cutting machine of the pantograph type, in which the cutting torch or element is guided by means of a fixed cam to cut a particular pattern in a pipe section.

Another object of my invention is to provide a novel means of adjusting a cam follower relative to a fixed cam surface so that the shape of the hole in the pipe which is being cut can be varied as required.

Still another object is to provide a novel contour pipe cutting machine in which the cutting torch or element can be adjusted as required to compensate for the different pipe sizes.

Other objects, advantages and features of invention may appear from the accompanying drawings, the subjoined detailed description and the appended claims.

Figure 1:
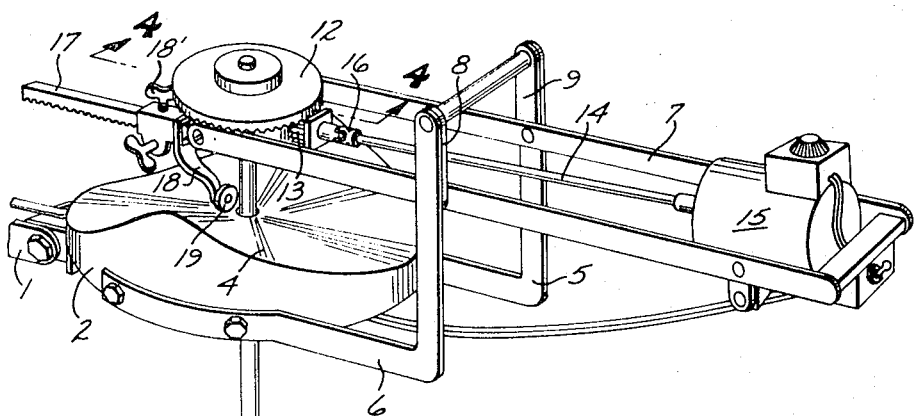
FIGURE 1 is a fragmentary perspective view of my contour pipe cutting machine.

Referring more particularly to the drawing, the numeral 1 indicates a suitable stationary frame which supports my pipe cutting machine and its particular shape is of no moment as far as this invention is concerned. A cam plate 2 is fixedly attached to or mounted on the frame 1, for example, by means of the bolting bracket 3. The cam plate 2 has a horizontal cam surface 4 on the upper face thereof, and this cam surface can be variously shaped as might be required by the character of the work to be accomplished. The cam surface 4 is substantially circular in shape and concave, substantially as shown.

Figure 3:
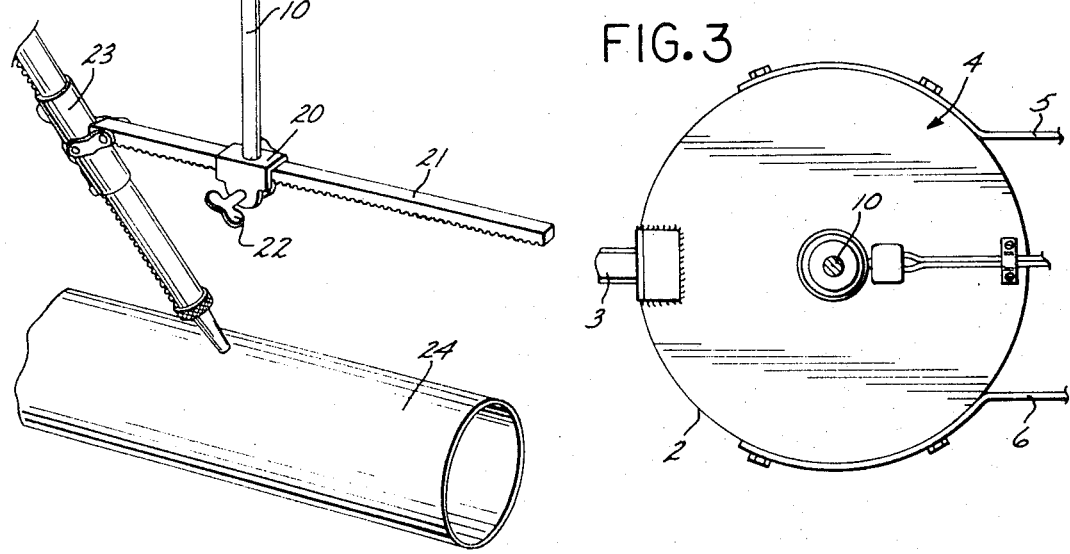
FIGURE 3 is a sectional view taken on line 3—3 of FIGURE 2.
Figure 2:
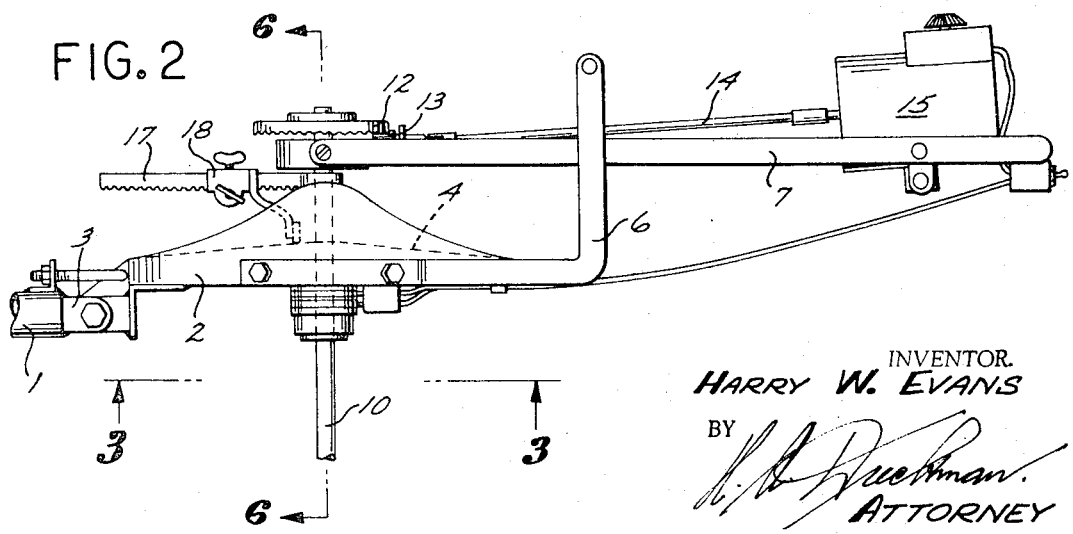
FIGURE 2 is a side elevation of the same.
Figure 4:
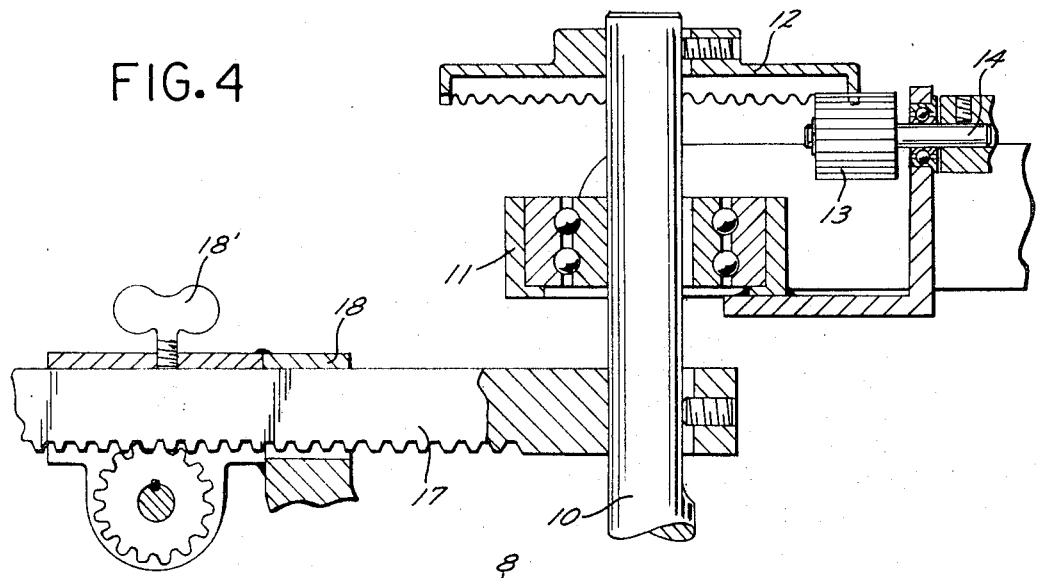
FIGURE 4 is a sectional view taken on line 4—4 of FIGURE 1.
Figure 5:
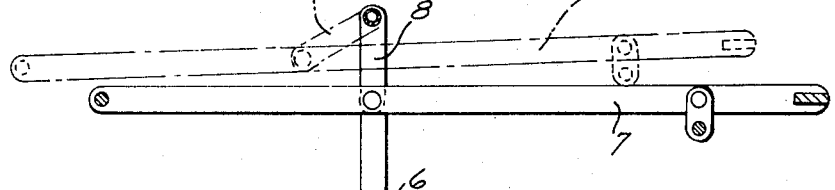
FIGURE 5 is a fragmentary side elevation of the electric motor frame.
Figure 6:
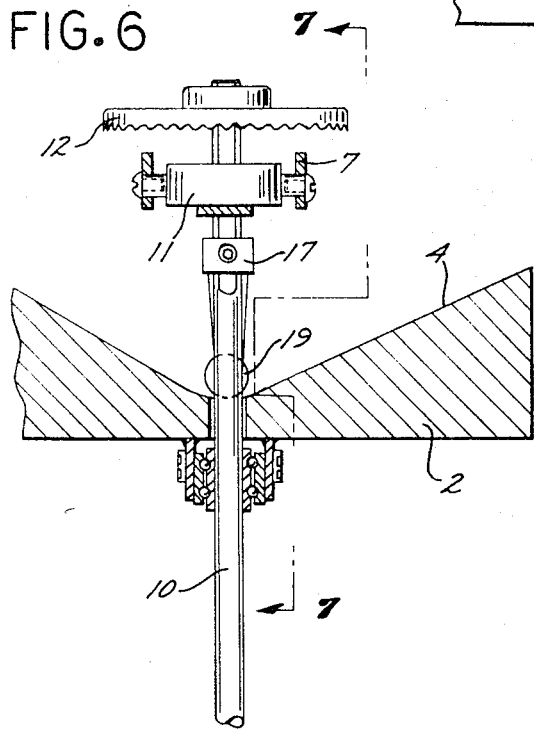
FIGURE 6 is a sectional view taken on line 6—6 of FIGURE 2.
Figure 7:
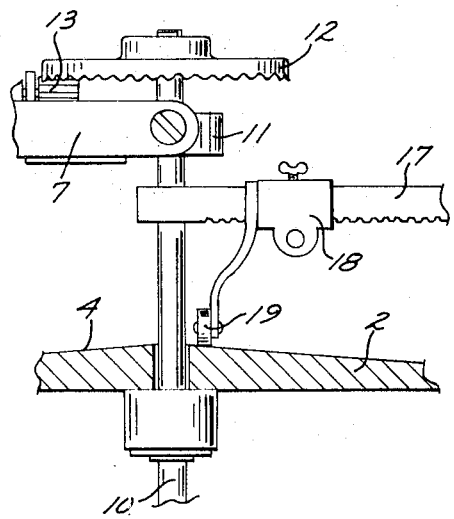
FIGURE 7 is a sectional view taken on line 7—7 of FIGURE 6.

The cam plate 2 supports a drive assembly consisting of a pair of arms 5 and 6 which are bolted to the side of the cam plate 2, as best shown in FIGURES 1 and 3. A substantially rectangular motor frame 7 is hingedly attached to the upper ends of the arms 5 and 6 by means of a pair of links 8 and 9. Thus the motor frame 7 can be tilted or moved vertically relative to the attaching arms 5 and 6, as will be subsequently described. A shaft 10 extends vertically through the cam plate 2 and is mounted in a bearing 11, which is attached to one end of the motor frame 7. A ring gear 12 is attached to the upper end of the shaft 10 and this gear, together with the shaft 10, is rotated by the pinion 13. This pinion, in turn, is rotated by the drive shaft 14 extending from the motor 15. The motor 15, in turn, is attached to one end of the motor frame 7, as best shown in FIGURE 1. A universal joint 16 in the shaft 14 permits limited vertical movement of this shaft, as might be induced by the action of the cam surface 4, as will be further described.

A rack 17 is mounted on the shaft 10 for rotation therewith; however, the rack can be adjusted vertically on the shaft 10 as required. A finger 18 is slidably mounted on the rack 17 and this finger includes a roller 19 thereon which rests on the cam surface 4. Since the cam follower 18 can be adjusted on the rack 17, it is set in any desired position by the set screw 18′. Thus as the shaft 10 is rotated by the motor 15 the cam follower or finger 18 will follow the contour of the cam surface 4, to thus move the shaft 10 vertically in accordance with the shape of the cam surface 4. The motor frame 7 can tilt slightly to compensate for the vertical movement of the cam follower 18, due to the links 8 and 9.

On the lower end of the shaft 10 I provide a sleeve 20 which receives a horizontally extending rack bar 21. The rack bar 21 can be adjusted horizontally in the sleeve 20 and can be set in its required position by the set screw 22. A cutting torch 23, either electrical or gas, is mounted on one end of the rack 21 and this torch is positioned adjacent to the pipe 24 to cut the required hole opening or shape in that pipe. It is evident that the hole or opening in the pipe 24 need not be at the end thereof necessarily, but can be at any point throughout the length of the pipe and the hole or other shape can be of any desired diameter within the limitations of the contour pipe cutting machine.

In operation:

The pipe 24 is positioned adjacent to the frame 1 and the cam follower 18 is adjusted relative to the cam surface 4 to cut a hole of the proper shape in diameter for the particular job. The torch 23 is now positioned at the proper angle and distance from the pipe 24, also to cut the hole of proper shape and diameter. The motor 15 is now started, which will rotate the shaft 10 causing the cam follower 18 to move circularly around the cam surface 4, and thus guiding the cutting torch 23 relative to the pipe 24 to cut the desired hole in the pipe.

Having described my invention, I claim:

1. A contour pipe cutting machine comprising a frame, a cam plate fixedly mounted on said frame, a cam surface on the cam plate, a shaft slidably extending through said cam plate, a motor frame, supporting arms extending from said cam plate to the motor frame, means hingedly attaching the motor frame to the supporting arms, a motor mounted in the motor frame, drive means extending from the motor to the shaft to rotate said shaft, a finger engaging the cam surface, means on said shaft adjustably mounting the finger for selective positioning on the cam surface, a cutting torch, and means adjustably mounting the cutting torch on the shaft.

2. A contour pipe cutting machine as recited in claim 1, and said means on the shaft adjustably mounting the finger comprising a rack, means attaching one end of the rack to the shaft, and means slidably mounting said finger on the rack.

3. A contour pipe cutting machine as recited in claim 1, and said means adjustably mounting the cutting torch on the shaft, including a sleeve on said shaft and a rack bar slidably mounted in the sleeve, said cutting torch being attached to one end of the rack bar.

4. A contour pipe cutting machine as recited in claim 1, and said means on the shaft adjustably mounting the finger comprising a rack, means attaching one end of the rack to the shaft, means slidably mounting said finger on the rack, and said means adjustably mounting the cutting torch on the shaft, including a sleeve on said shaft and a rack bar slidably mounted in the sleeve, said cutting torch being attached to one end of the rack bar.

References Cited

UNITED STATES PATENTS 2,623,285 12/1952 Marinovich _____ 266—23 X
3,388,901 6/1968 Ferguson _____ 266—23

J. SPENCER OVERHOLSER, *Primary Examiner.*

ROBERT D. BALDWIN, *Assistant Examiner.*

U.S. Cl. X.R.

33—21